United States Patent
Rao

(10) Patent No.: US 8,038,407 B2
(45) Date of Patent: Oct. 18, 2011

(54) WIND TURBINE BLADE WITH IMPROVED TRAILING EDGE BOND

(75) Inventor: Kavala Venkateswara Rao, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/881,542

(22) Filed: Sep. 14, 2010

(65) Prior Publication Data

US 2011/0142668 A1 Jun. 16, 2011

(51) Int. Cl.
*F01D 5/14* (2006.01)
(52) U.S. Cl. .................. 416/224; 416/226; 416/227 R; 416/229 R; 416/233
(58) Field of Classification Search .............. 416/224, 416/226, 227 R, 229 R, 233
See application file for complete search history.

(56) References Cited

U.S. PATENT DOCUMENTS

| | | | | |
|---|---|---|---|---|
| 2,884,078 A | | 4/1959 | Stamm et al. | |
| 2,963,094 A | * | 12/1960 | Cantinieau | 416/226 |
| 3,390,393 A | * | 6/1968 | Upton | 416/226 |
| 3,586,460 A | * | 6/1971 | Toner | 416/230 |
| 3,799,700 A | * | 3/1974 | Broekhuizen et al. | 416/226 |
| 4,295,790 A | * | 10/1981 | Eggert, Jr. | 416/226 |
| 4,329,119 A | | 5/1982 | Baskin | |
| 4,474,536 A | | 10/1984 | Gougeon et al. | |
| 4,806,077 A | * | 2/1989 | Bost | 416/226 |
| 6,264,877 B1 | | 7/2001 | De La Barriere | |
| 6,327,957 B1 | * | 12/2001 | Carter, Sr. | 416/159 |
| 7,637,721 B2 | | 12/2009 | Driver et al. | |
| 7,854,594 B2 | | 12/2010 | Judge | |
| 2007/0025858 A1 | | 2/2007 | Driver et al. | |
| 2007/0036659 A1 | | 2/2007 | Hibbard | |

FOREIGN PATENT DOCUMENTS

| | | |
|---|---|---|
| WO | WO 2007/051465 | 5/2007 |
| WO | WO 2008/086805 | 7/2008 |

OTHER PUBLICATIONS

Pending and Commonly Owned Application U.S. Appl. No. 12/968,709.
Pending and Commonly Owned Application U.S. Appl. No. 12/152,010.

* cited by examiner

*Primary Examiner* — Igor Kershteyn
(74) *Attorney, Agent, or Firm* — Dority & Manning, P.A.

(57) ABSTRACT

A wind turbine blade includes a leading edge and a trailing edge. The blade has an upper shell member and a lower shell member, with each of the shell members having a forward edge bonded at the leading edge of the blade and a rearward edge. A rigid bond cap is pre-formed into a designed size and shape of the trailing edge of the blade. The bond cap includes oppositely oriented leg members bonded to the respective rearward edges of the shell members so as to be essentially flush with the upper and lower shell members. The rigid bond cap defines at least a portion of the trailing edge of the blade and a primary external bonding bridge between the upper and lower shell members at the rearward edges.

20 Claims, 5 Drawing Sheets

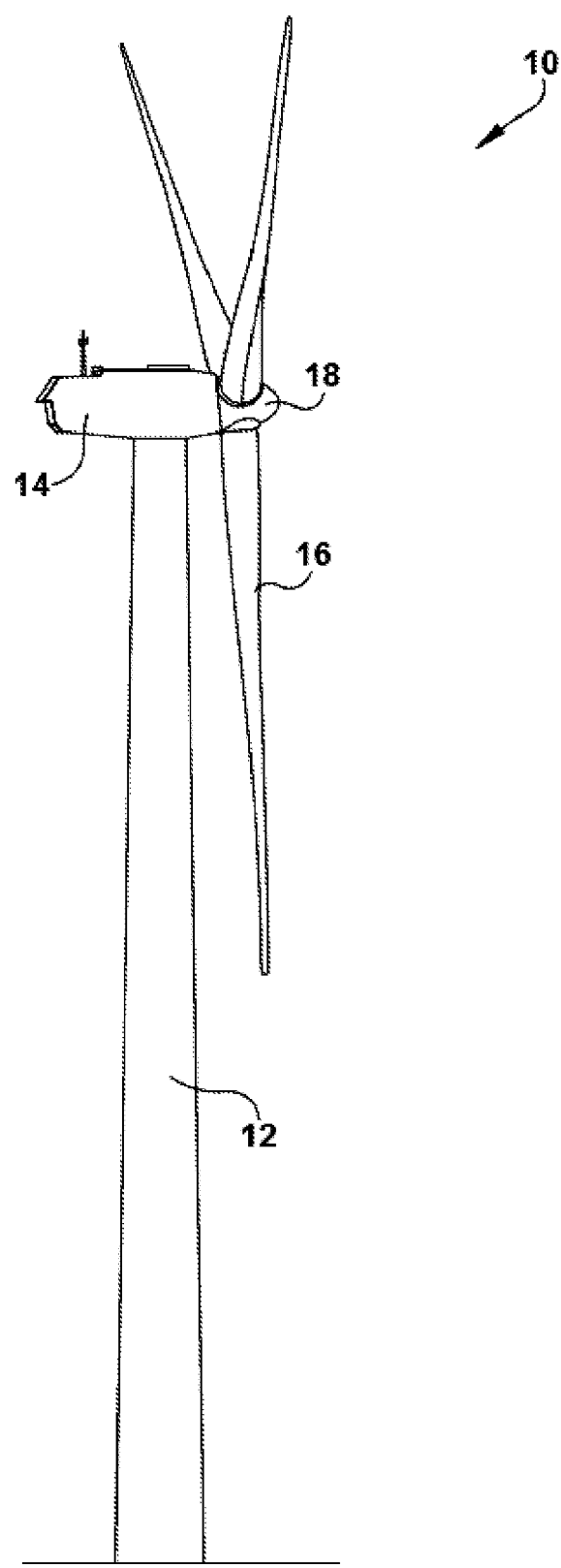
*Fig. -1-*

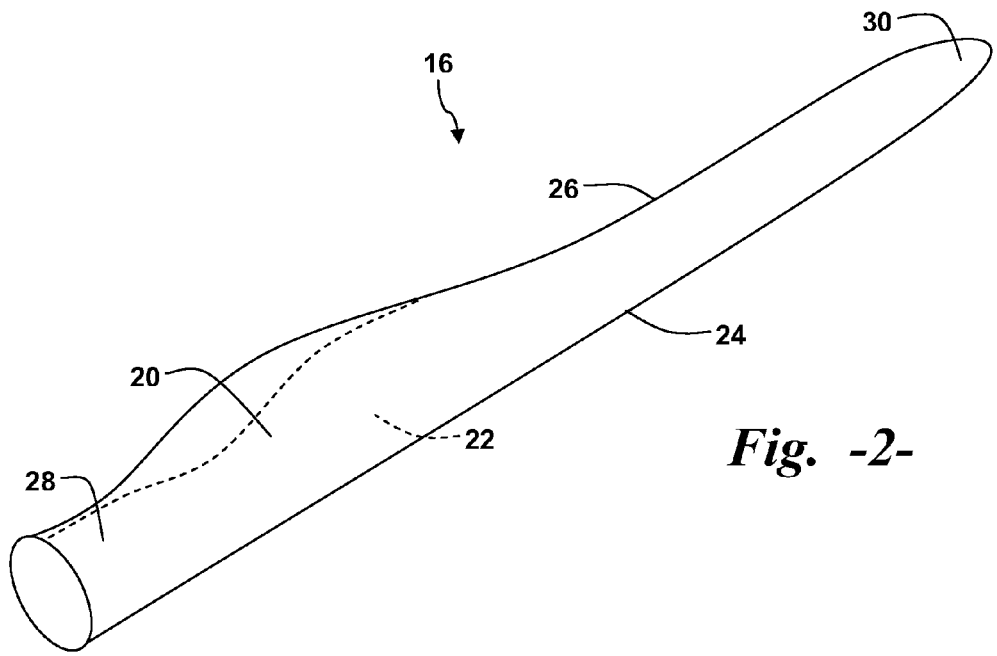
*Fig. -2-*
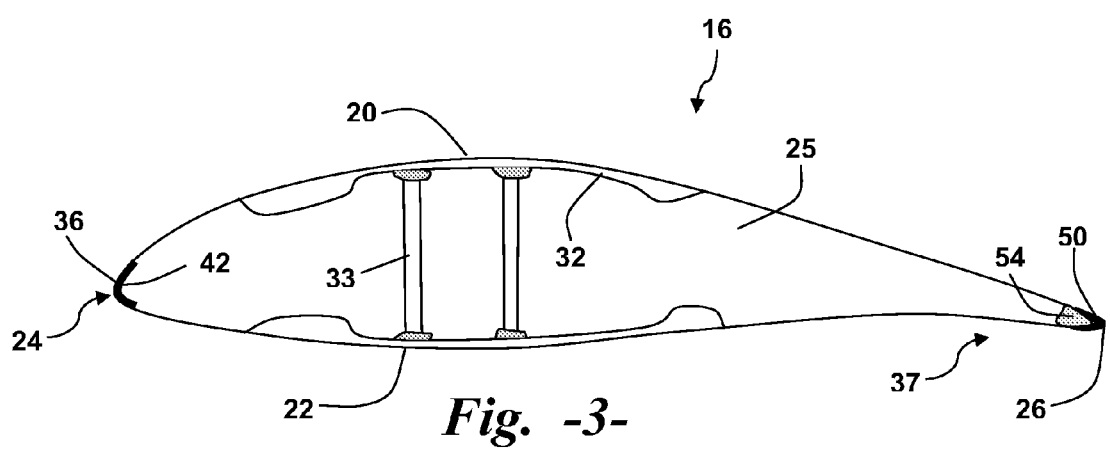
*Fig. -3-*

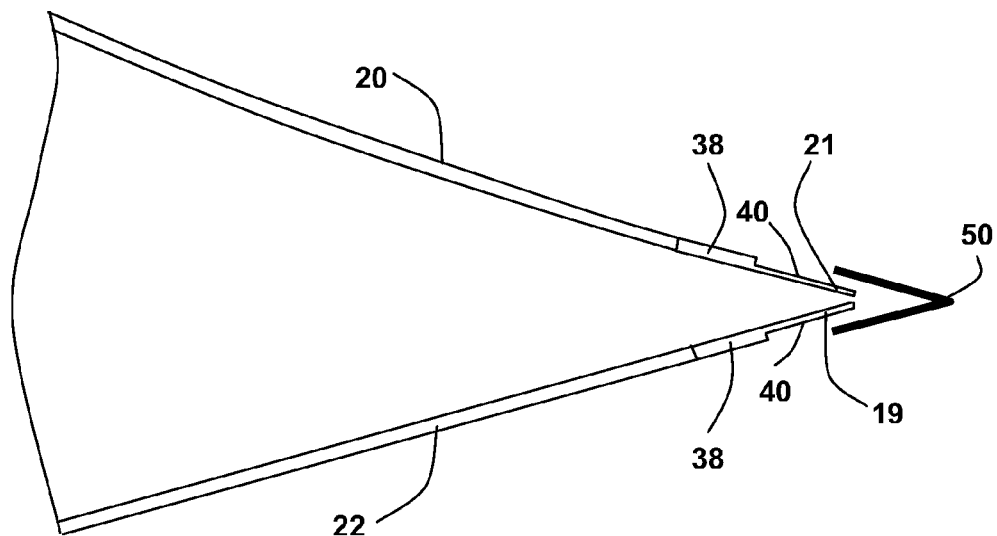
Fig. -4-
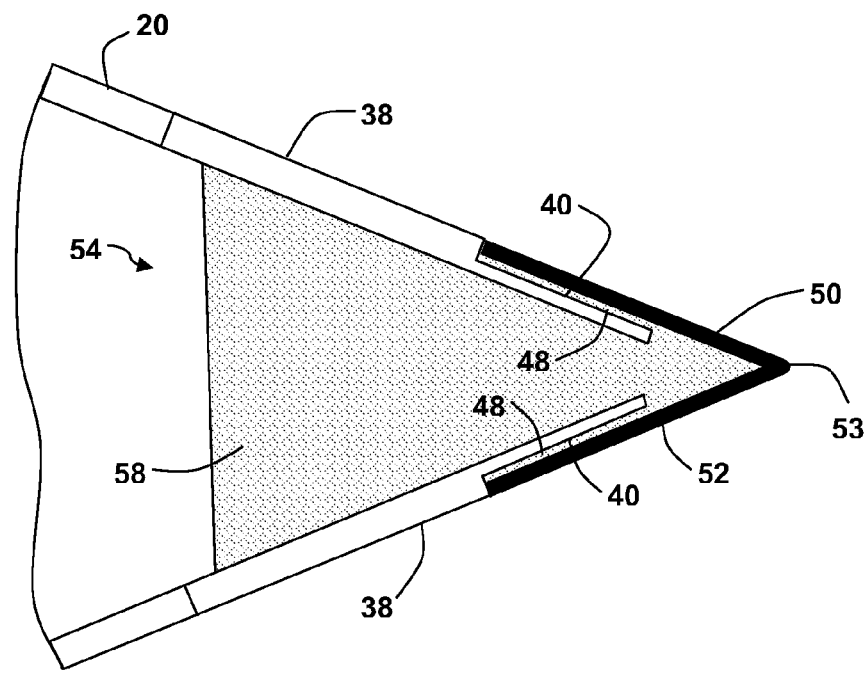
Fig. -5-

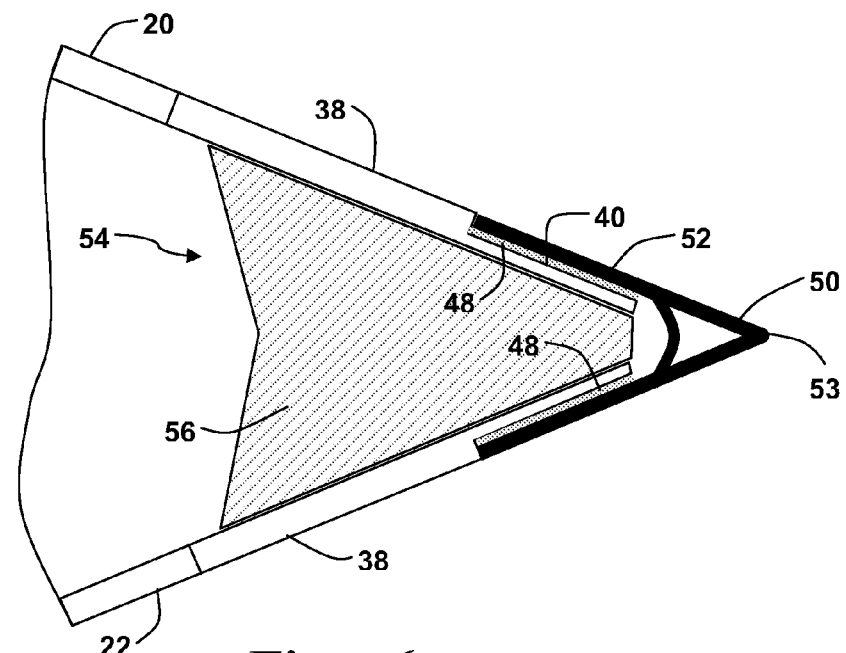
Fig. -6-
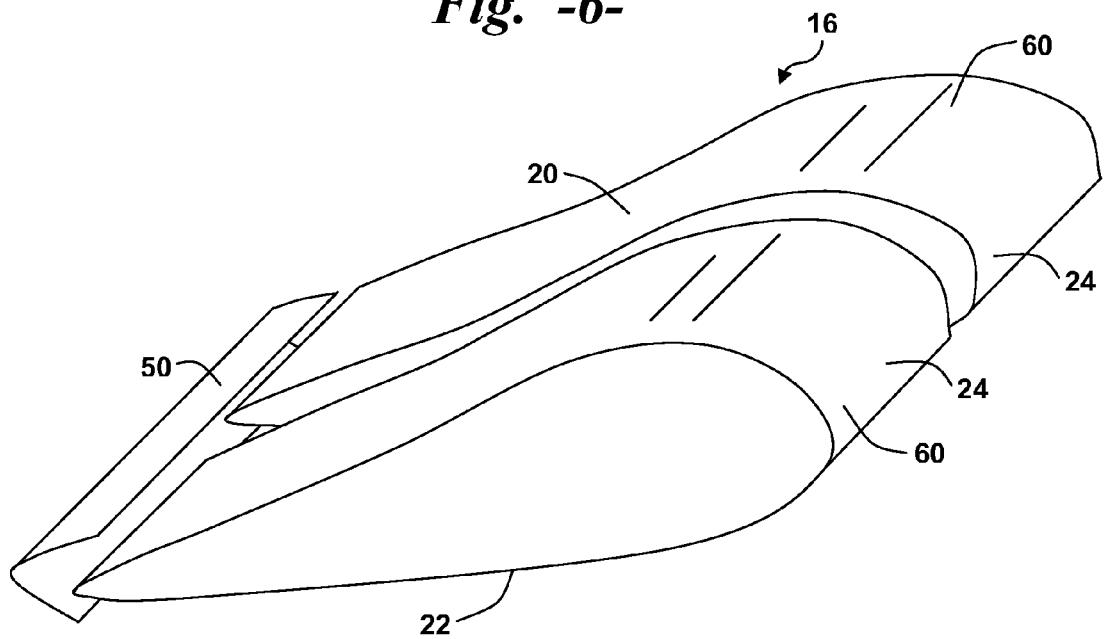
Fig. -7-

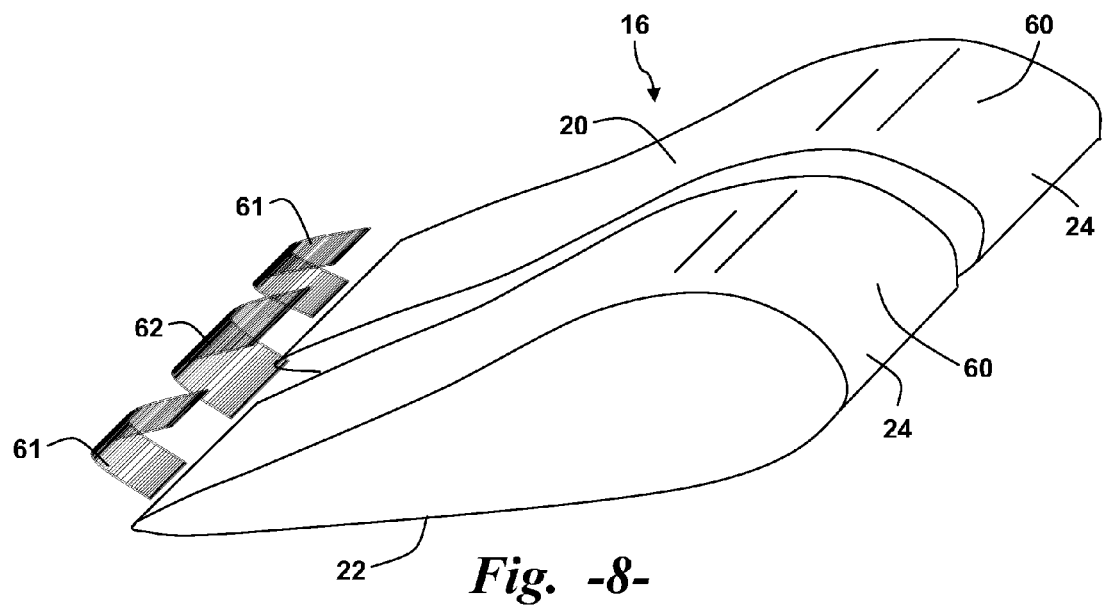
Fig. -8-

WIND TURBINE BLADE WITH IMPROVED TRAILING EDGE BOND

FIELD OF THE INVENTION

The present invention relates generally to the field of wind turbines, and more particularly to turbine blades having an improved bond configuration along the trailing edge bonding line.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell and a lower (pressure side) shell that are bonded together at bond lines along the trailing and leading edges of the blade. The bond lines are generally formed by applying a suitable bonding paste or compound along the bond line with a minimum designed bond width between the shell members. These bonding lines, particularly at the trailing edge of the blade, are a critical design constraint of the blades. A significant number of turbine blade field failures are bond line related, with trailing edge failures being the most common. Separation of the bond line along the trailing edge of an operational turbine blade can result in a catastrophic failure and damage to the wind turbine.

In addition, the trailing edge bonding process is a challenging and time consuming task. Application of the bond paste to achieve the required bonding thickness and width is difficult. Post bond trimming of the trailing edge to remove excess bond paste, trim reinforcement material, and so forth, is a time consuming and expensive finishing operation. Even after the trimming process, it is often necessary to perform subsequent trailing edge repairs/modifications before the blade is field-ready.

Conventional trailing edge bond configurations are also highly susceptible to erosion in the field, which results in costly and expensive field repairs.

U.S. Patent Application Pub. No. 2007/0025858 proposes to provide a trailing edge cap intended to be placed over the designed trailing edge of a wind turbine blade in order to reduce noise generated at the trailing edge. The cap has a configuration so as to extend well past the original trailing edge of the blade and to define a reduced trailing edge thickness as compared to the original trailing edge. The cap is flexible and is designed to conform to a variety of differently sized and shaped turbine blades. Although this trailing edge cap may provide reduced noise benefits, it does not address the trailing edge structural bonding issues discussed above.

Accordingly, the industry would benefit from an improved bond configuration that is cost effective, time efficient, and produces an improved structural bond, particularly along the trailing edge of the wind turbine blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having a leading edge and a trailing edge. The blade includes an upper shell member and a lower shell member, with each of the shell members having a forward edge bonded at the leading edge of the blade and a rearward edge. A rigid bond cap is provided, which is pre-formed into a designed size and shape so as to define at least a portion of the trailing edge of the blade. The bond cap includes generally oppositely oriented leg members bonded to the respective rearward edges of the shell members so as to be essentially flush with the upper and lower shell members. The bond cap extends from the shell members and defines at least a portion of the longitudinally extending trailing edge of the blade. The bond cap defines an external bonding bridge that is the primary seal between the upper and lower shell members at the respective rearward edges.

In a particular embodiment, the blade may also include an internal cushion pad disposed between the rearward edges of the upper and lower shell members. This component serves primarily to prevent impact ("crashing") of the shell members along the rearward edges. The cushion pad may be a compressible, resilient member, such as a rubber-like material, or in an alternate embodiment may be a rigid material, such as a cured bond paste. With the bond paste embodiment, the bond paste also provides a secondary bond between the rearward edges of the shell members and may also extend beyond the rearward edges and at least partially fill the bond cap.

The bond cap may attach to the shell members in various ways. In a particular embodiment, the rearward edges of the shell members include a reduced thickness notch, with the legs of the bond cap affixed in the notches along the rearward edges with, for example, a bond paste. The notch configuration may be defined in a structural reinforcement member that defines the rearward edges of the shell members.

The bond cap may take on various shapes and configurations within the scope and spirit of the invention. In a particular embodiment, the bond cap is a continuous structural member having an open end and a closed apex, such as a V-shape, C-shape, U-shape, and so forth. The bond cap is pre-formed with dimensions and a shape that provide a designed trailing edge profile for the respective turbine blade.

In an embodiment wherein the turbine blade includes a plurality of blade segments, the bond cap may be a single member that is common to and bridges all of the blade segments. In an alternate embodiment, the individual blade segments may include a respective bond cap along a portion thereof with a bridge bond cap provided between adjacent blade segments.

The invention also encompasses a wind turbine having one or more turbine blades configured with the unique bond line configuration described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of an embodiment of a conventional wind turbine blade;

FIG. 3 is a cross-sectional view of an exemplary wind turbine blade in accordance with aspects of the invention;

FIG. 4 is an enlarged cross-sectional and component view of a trailing edge bond configuration;

FIG. 5 is an enlarged cross-sectional view of a particular embodiment of a trailing edge bond configuration;

FIG. 6 is an enlarged cross-sectional view of an alternate trailing edge bond configuration;

FIG. 7 is a partial perspective view of a multi-segment turbine blade with a continuous single bond cap; and, FIG. 8 is a partial perspective view of a multi-segmented turbine blade with a plurality of respective bond caps.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26. The blade 16 includes an internal cavity in which various structural members, such as spar caps 32 and webs 33, are configured.

Referring to FIG. 3, the shell members 20, 22 include respective forward edges that are bonded at a leading edge bond line 36 and at a trailing edge bond configuration 37 in accordance with aspects of the invention and described in greater detail herein. The leading edge bond line 36 (and aspects of the trailing edge bond configuration 37) may use a conventional bond paste. It should be appreciated that the term "bond paste" is used herein in a generic sense to encompass any type of adhesive or bonding material. The particular type of bond paste is not particularly relevant to the present invention, and any suitable type of epoxy, compound, or other material may be used in this regard.

A leading edge structural member 42, which may be a shaped reinforced composite member, may be provided along the leading edge bond line 36 to add rigidity and strength to the leading edge 24, as is known in the art.

Referring to FIGS. 3 and 4 in general, a rigid bond cap 50 is provided as the component that defines the trailing edge 26 of the blade 16. The cap 50 is a rigid component that is pre-formed into the designed size and shape of the trailing edge 26 and attached to the rearward edges 19, 21 of the upper and lower shell members 20, 22 so as to define the trailing edge 26 along at least a portion of the blade 16. Thus, it should be understood that the bond cap 50 is not a protective covering that is placed over an existing trailing edge of a blade, but is a rigid, structural component that extends from the rearward edges 19, 21 to define the designed trailing edge profile of the blade 16. The bond cap 50 defines an external bonding bridge that is the primary seal between the upper and lower shell members 20, 22 at the respective rearward edges 19, 21.

The bond cap 50 in the illustrated embodiments includes generally oppositely oriented leg members 52 that are bonded to the respective rearward edges 19, 21 of the shell members 20, 22 so as to be essentially flush with the upper and lower shell members, as depicted in FIGS. 5 and 6. This configuration reduces noise generation and the likelihood of adverse aerodynamic effects from the bond cap 50. In the illustrated embodiments, the flush configuration is achieved by a notch 40 defined in the rearward edges 19, 21 of the shell members 20, 22. The notch 40 has a reduced thickness as compared to the adjacent portion of the respective shell member 20, 22 so that a leg member 52 of the bond cap 50 can be bonded to the surface of the notch 40 (i.e., with a layer of bond paste 48 as depicted in FIGS. 5 and 6) and lie in essentially the same plane as the upper surface of the respective shell member 20, 22. It should be appreciated that the term "notch" is used herein to encompass any suitable type of recess or engaging surface defined in the rearward edges 19, 21 for receipt of the leg members 52.

The bond cap 50 may take on various shapes and configurations within the scope and spirit of the invention as a function of the desired profile of the trailing edge 26 for a particular blade 16. In a particular embodiment, the bond cap 50 is a continuous structural member having an open end defined by the diverging leg members 52 and a closed apex 53. The bond cap 50 may have, for example, a V-shape, C-shape, U-shape, and so forth. The bond cap 50 is preformed from any suitable rigid material, composition, composite, or the like, that gives the desired structural characteristics to the trailing edge 26.

The bond cap 50 may be attached to the rearward edges 19, 21 in various ways, including mechanical means, bond paste, and so forth. As mentioned, in the embodiments illustrated herein, a layer of bond paste 48 is used to attach the legs 52 to the reduced thickness notches 40 in the rearward edges 19, 21 of the shell members 20, 22.

For increased rigidity and strength, the rearward edges 19, 21 of the shell members 20, 22 may be defined by structural reinforcement members 38 that are attached to the skin of the upper and lower shell members 20, 22. These reinforcement members 38 may be formed of any suitable fiber composite material that provides a rigid connection point for the bond cap 50. The notch 40 discussed above may be defined in the structural reinforcement members 38, as depicted in FIGS. 5 and 6.

In particular embodiments as illustrated in FIGS. 5 and 6, the blade 16 may also include an internal cushion pad 54 disposed between the rearward edges 19, 21 of the upper and lower shell members 20, 22. This pad component 54 serves primarily to prevent detrimental impact ("crashing") of the shell members 20, 22 along the rearward edges 19, 21 during operation of the wind turbine. In a particular embodiment as illustrated in FIG. 6, the cushion pad 54 may be a compressible, resilient member 56, such as a rubber-like or foam material, that is adhered or otherwise attached to the inner surfaces of the rearward edges 19, 21 (e.g., to the inner surfaces of the structural reinforcement members 38). This type of material will allow for a relative degree of compression of the shell members 20, 22 (and bond cap 50) along the rearward edges 19, 21, which may be desired in certain blade designs.

In an alternate embodiment illustrated for example in FIG. 5, the cushion pad 54 may be defined by a rigid and relatively uncompressible material 58. This material 58 may be, for example, a deposit of bond paste applied between the rearward edges 19, 21 (e.g., between the structural reinforcement members 38). The bond paste 58 may extend beyond the rearward edges 19, 21 so as to at least partially fill the bond cap 50, and may also be the same material used to attach the bond cap 50 to the rearward edges 19, 21, as shown in FIG. 5. With this embodiment, the cured bond paste 58 adds to the structural rigidity of the bond cap 50 (and trailing edge 26 overall) and also provides a secondary bond between the rearward edges 19, 21 of the shell members.

Referring to FIGS. 7 and 8, the turbine blade 16 may be formed from a plurality of blade segments 60, as is known in the art. With this type of blade configuration, the bond cap 50 may be incorporated in various ways. For example, referring to the embodiment of FIG. 7, the bond cap 50 may be a single member that is common to and bridges multiple ones (or all) of the blade segments 60. With this embodiment, the individual blade segments 60 are not provided with individual bond caps and, after assembly of the segments 60 into a blade, the single bond cap 50 may be attached to define the trailing edge 26 of the blade 16, as discussed above.

In an alternate embodiment illustrated in FIG. 8, the individual blade segments 60 include a partial respective bond cap 61 along a portion thereof. In other words, each blade segment 60 includes a partial trailing edge defined by an individual blade bond cap 61. A bridge bond cap 62 is used to span between adjacent segments 60 when the blade is assembled. Thus, in the final blade 16, the bond cap 5Q is defined by a plurality of blade bond caps 61 and bridge bond caps 62.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade with a leading edge and a trailing edge, said blade comprising:
   an upper shell member and a lower shell member, each of said upper shell member and said lower shell member comprising a forward edge bonded at said leading edge and a rearward edge; and,
   a rigid bond cap pre-formed into a designed size and shape so as to define at least an externally exposed portion of said trailing edge of said blade, said bond cap comprising oppositely oriented leg members bonded to said respective rearward edges of said upper and lower shell members so as to define said exposed portion of said trailing edge of said blade and be essentially flush with said upper and lower shell members;
   wherein said rigid bond cap defines a primary external bonding bridge between said rearward edge of said upper and lower shell members.

2. The wind turbine blade as in claim 1, further comprising a reduced thickness notch defined in each of said rearward edges, said bond cap bonded to said rearward edges at said respective notches.

3. The wind turbine blade as in claim 2, wherein said upper and lower shell members comprise structural reinforcement members at said respective rearward edge, said notch defined in said structural reinforcement member.

4. The wind turbine blade as in claim 3, comprising a layer of bond paste between said structural reinforcement member and said leg of said bond cap.

5. The wind turbine blade as in claim 1, wherein said bond cap comprises a continuous structural member having an open end and a closed apex.

6. A wind turbine blade with a leading edge and a trailing edge, said blade comprising:
   an upper shell member and a lower shell member, each of said upper shell member and said lower shell member comprising a forward edge bonded at said leading edge and a rearward edge;
   a rigid bond cap pre-formed into a designed size and shape so as to define at least a portion of said trailing edge of said blade, said bond cap comprising oppositely oriented leg members bonded to said respective rearward edges of said upper and lower shell members so as to define at least a portion of said trailing edge of said blade and be essentially flush with said upper and lower shell members;
   wherein said rigid bond cap defines a primary external bonding bridge between said rearward edge of said upper and lower shell members; and
   further comprising an internal cushion pad disposed between said rearward edges of said upper and lower shell members, said cushion pad primarily preventing crashing of said upper and lower shell members along said rearward edges.

7. The wind turbine blade as in claim 6, wherein said cushion pad comprises a compressible resilient material.

8. The wind turbine blade as in claim 6, wherein said cushion pad comprises a rigid material.

9. The wind turbine blade as in claim 8, wherein said cushion pad comprises a bond paste that further defines an internal secondary bond between said rearward edges.

10. The wind turbine blade as in claim 9, wherein said bond paste extends beyond said rearward edges and at least partially fills said bond cap.

11. A wind turbine blade with a leading edge and a trailing edge, said blade comprising:
    an upper shell member and a lower shell member, each of said upper shell member and said lower shell member comprising a forward edge bonded at said leading edge and a rearward edge;
    a rigid bond cap pre-formed into a designed size and shape so as to define at least a portion of said trailing edge of said blade, said bond cap comprising oppositely oriented leg members bonded to said respective rearward edges of said upper and lower shell members so as to define at least a portion of said trailing edge of said blade and be essentially flush with said upper and lower shell members;

wherein said rigid bond cap defines a primary external bonding bridge between said rearward edge of said upper and lower shell members; and wherein said blade comprises a plurality of blade segments, said bond cap comprising a single member that is common to and interconnects said blade segments.

12. A wind turbine blade with a leading edge and a trailing edge, said blade comprising:

an upper shell member and a lower shell member, each of said upper shell member and said lower shell member comprising edge bonded at said leading edge and a rearward edge;

a rigid bond cap pre-formed into a designed size and shape so as to define at least a portion of said trailing edge of said blade, said bond cap comprising oppositely oriented leg members bonded to said respective rearward edges of said upper and lower shell members so as to define at least a portion of said trailing edge of said blade and be essentially flush with said upper and lower shell members;

wherein said rigid bond cap defines a primary external bonding bridge between said rearward edge of said upper and lower shell members; and wherein said blade comprises a plurality of blade segments, each of said segments comprising a respective said bond cap, and further comprising a bridge bond cap between adjacent said blade segments.

13. A wind turbine, said wind turbine comprising a plurality of turbine blades, at least one of said turbine blades comprising:

an upper shell member and a lower shell member, each of said upper shell member and said lower shell member comprising a forward edge bonded at said leading edge and a rearward edge; and, a rigid bond cap pre-formed into a designed size and shape so as to define at least a portion of said trailing edge of said blade, said bond cap comprising oppositely oriented leg members bonded to said respective rearward edges of said upper and lower shell members so as to define at least a portion of said trailing edge of said blade and be essentially flush with said upper and lower shell members;

wherein said rigid bond cap defines a primary external bonding bridge between said rearward edges of said upper and lower shell members.

14. The wind turbine as in claim 13, further comprising an internal cushion pad disposed between said rearward edges of said upper and lower shell members, said cushion pad primarily preventing crashing of said upper and lower shell members along said rearward edges.

15. The wind turbine as in claim 14, wherein said cushion pad comprises a compressible resilient material.

16. The wind turbine as in claim 14, wherein said cushion pad comprises a bond paste that further defines an internal secondary bond between said rearward edges.

17. The wind turbine as in claim 13, further comprising a reduced thickness notch defined in each of said rearward edges, said bond cap bonded to said rearward edges along said respective notches.

18. The wind turbine as in claim 17, wherein said upper and lower shell members comprise structural reinforcement members at said respective rearward edge, said notch defined in said structural reinforcement member.

19. The wind turbine as in claim 13, wherein said blade comprises a plurality of blade segments, said bond cap comprising a single member that is common to and interconnects said blade segments.

20. The wind turbine as in claim 13, wherein said blade comprises a plurality of blade segments, each of said segments comprising a respective said bond cap, and further comprising a bridge bond cap between adjacent said blade segments.

* * * * *